Jan. 25, 1955
J. L. WALL
2,700,708
AUTOMATIC SAFETY SWITCH FOR VEHICLES
Filed May 17, 1954
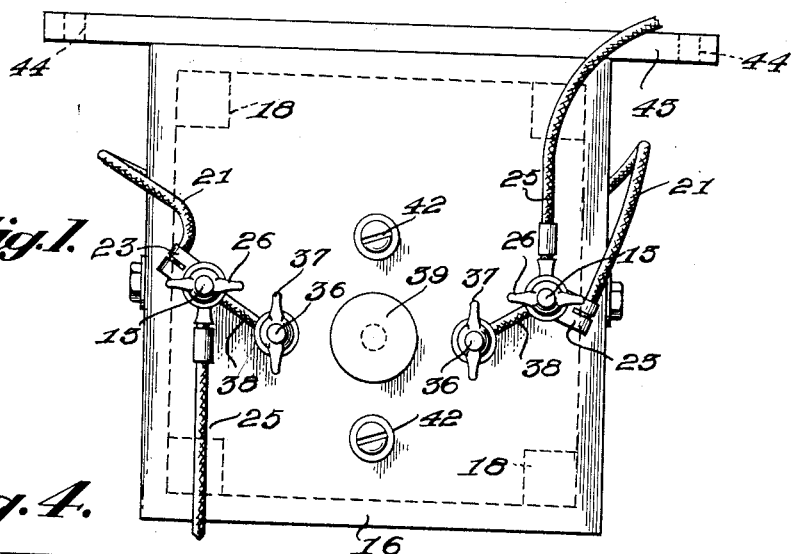
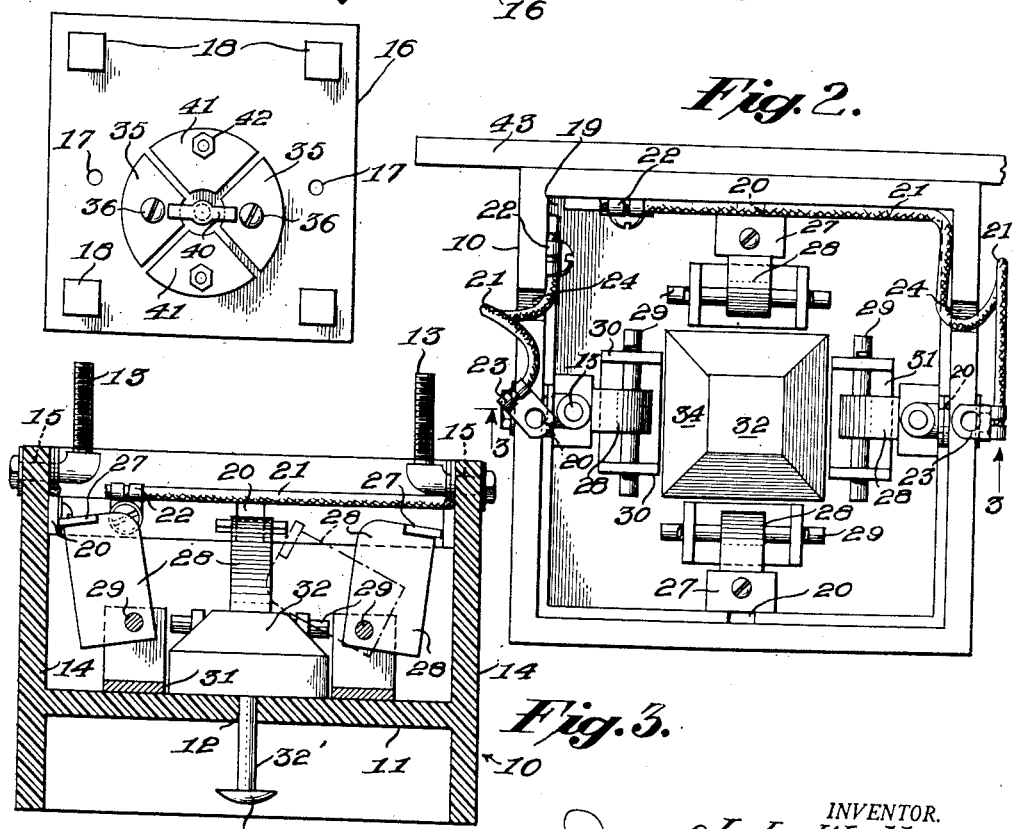
INVENTOR.
J. L. Wall
BY
Attorney.

United States Patent Office 2,700,708
Patented Jan. 25, 1955

2,700,708

AUTOMATIC SAFETY SWITCH FOR VEHICLES

James L. Wall, Soperton, Ga., assignor of one-half to J. L. Crossley, Soperton, Ga.

Application May 17, 1954, Serial No. 430,206

5 Claims. (Cl. 200—61.52)

This invention relates to an automatic safety switch for vehicles.

The invention is more particularly concerned with a switch or automatic circuit breaker which is capable of ready assembly on a vehicle, and particularly a wheel tractor and an automobile, and which is operative to automatically break the ignition circuit upon overturning of the vehicle or when the vehicle becomes inclined to the horizontal to such a degree that overturning thereof is imminent.

It is recognized that various forms of safety switches or electric circuit breakers have heretofore been provided or proposed for the above referred to purpose. Such prior constructions, however, were wholly effective only upon overturning of the vehicle and were not responsive to dangerous vehicle tilting positions at angles to right-angularly disposed planes, and accordingly they failed to provide a safeguard under all possible circumstances, such as opposite side tilting and forward and rear end tilting of the vehicle.

It is accordingly a primary object of this invention to provide a safety switch or electric circuit breaker for installation in the electric circuit of automobiles or similar vehicles, and which is operative to interrupt the circuit upon dangerous tilting of the vehicle in various directions relative to the longitudinal vertical plane of the vehicle.

A further object of the invention is to provide a safety switch or electric circuit breaker for vehicles which is automatically operative to break the circuit upon tilting of the vehicles, and which includes a manually operative circuit-closing means.

A still further object of the invention is to provide an automatic safety switch or electric circuit breaker which is gravity-operated and is, therefore, dependable in operation under all circumstances.

Other objects and advantages of the invention will become apparent in the course of the following detailed description, taken in connection with the accompanying drawings wherein:

Figure 1 is a top plan view of the improved device in accordance with a preferred structural embodiment thereof.

Figure 2 is a top plan view of the switch box with the cover shown in Figure 1 removed.

Figure 3 is a vertical sectional view as observed substantially in the plane of line 3—3 on Figure 2.

Figure 4 is a bottom plan view of the cover on a reduced scale.

Referring now in detail to the drawing, the improved device comprises a box 10 which, while shown as of rectangular form, may be of other forms, and which is preferably of plastic material whereby to avoid otherwise necessary insulation.

The box 10 is open both at the top and the bottom thereof, but is provided with a horizontal partition 11 adjacent the bottom, and which is provided centrally thereof with an aperture 12. The box is provided with a pair of posts 13 which have insulated connections with two opposite side walls 14 thereof through stubs 15, as indicated in Figure 3. The box 10 has a cover 16 which is provided with a pair of apertures 17 for receiving the posts 13, and the cover 16 is provided with suitable means 18 engageable with the inner faces of the side walls of the box for maintaining the cover in proper position.

A metallic strip-form conductor extends around the inner faces of the side walls of the box 10 and which is interrupted at one corner of the box, as indicated at 19, and also at points 20 intermediate the side edges of the walls. The metallic conductor may be secured to the box walls by any suitable means.

Adjacent ends of leads 21 are connected to the metallic conductor, as at 22, and the opposite ends of the leads are provided with clips 23 for receiving the posts 13. The walls 14 of the box are provided with notches 24 through which the leads 21 extend from internally of the box to externally thereof.

When the cover 16 is removed, as in Figure 2, the clips 23 are free as shown. The cover is placed in position with the posts 13 extending through the apertures 17 therein, after which the clips 23 are placed over the posts. Thereafter adjacent ends of the vehicle electric supply line 25 are positioned over the posts and thumb nuts 26 are then turned down on the posts.

With this connection, the vehicle electric supply line is complete if the interruptions 20 in the metallic conductor are closed. Such interruptions are normally closed by metallic plates 27 supported by and loosely jointed on relatively heavy metallic blocks 28 which are secured to pins 29 rotatably supported in the vertical legs 30 of U-brackets 31 suitably supported on the partition 11.

It is to be particularly observed that the blocks 28 are so pivoted that they incline substantially toward the box walls when the box is in horizontal position, and accordingly the plates 27 are held in circuit-completing position under action of gravity. The blocks 28 will, however, move away from the metallic conductor upon undue tilting of the vehicle or heavy jolting thereof, as is indicated by dot-and-dash lines in Figure 3, with a resulting breaking of the ignition circuit. The particular block or blocks which will fall into inoperative position will depend upon the direction of tilting of the vehicle.

In order to reset the device by moving the blocks into operative position a member 32 is disposed within the brackets 31, and same is provided with a downwardly projecting stem 32' movable within aperture 12, and the stem terminates in a finger-engageable head 33.

The member 32 comprises an upper frusto-conical portion 34 and, as will be apparent from Figure 3, upward movement of member 32 will result in outward movement of the blocks 28 to their normal circuit-closing position.

Manual means are provided for restoring the circuit or for maintaining same independently of the blocks 28, and same comprises a pair of contact plates 35 on the bottom of cover 16 and through which extend posts 36 having thumb nuts 37, and the posts 36 are connected with posts 13 by leads 38.

The cover 16 is provided with a knob 39 on the outer face thereof, and an elongated contact member 40 on the inner side of the cover is movable with the knob to circuit-closing position as in Figure 4 or to a non-circuit closing position when reliance is to be had upon the automatic means.

When contact member 40 is in inoperative position it engages plates 41 suitably secured to the cover 16, as by screw bolts 42.

While four blocks 28 are shown, more or less may be used within the scope of the invention.

The box 10 may be provided with a suitable bracket 43 which is in turn provided with apertures 44 for securing the box in operative position.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. An automatic safety switch comprising a box, a pair of posts secured to and projecting upwardly from opposite wall portions of the box, a metallic conductor extending horizontally around the walls of the box internally thereof and including sections having gaps therebetween, leads connecting said posts with the terminal ones of said sections, an interrupted electric supply line having the ends thereof connected to said posts, and gravityactuated contacts normally bridging said gaps for current flow through said supply line, said contacts comprising plates secured to generally vertically disposed elongated blocks, said blocks being pivoted on normally horizontal axes disposed inwardly of the longitudinal centers of the blocks, whereby the blocks normally fall outwardly toward the walls of the box with the plates thereof in contact with adjacent ends of said sections.

2. The structure according to claim 1, wherein the pivot axes of said blocks comprise pins rotatably supported in the vertical legs of U-brackets supported by said box inwardly of the walls thereof and providing a space therebetween centrally of the box.

3. The structure according to claim 2, wherein said box is provided with a horizontal partition to which said brackets are secured, and a block re-set member disposed within said space and normally resting on said partition, said member including an upper frusto-conical portion against which said blocks fall upon substantial tilting of the box, and a finger-engageable stem projecting downwardly from said member and through said partition for raising said member and urging said blocks to normal circuit completing position.

4. The structure according to claim 3, together with a cover for said box, said cover being provided with apertures through which said posts project, and manually operable means supported by said cover for placing said posts in circuit connection independently of said metallic conductor and blocks.

5. The structure according to claim 4, wherein said means comprises a pair of contact plates on the underside of said cover, a second pair of posts extending upwardly from said contact plates through said cover, leads connecting said first pair of posts to said last pair of posts externally of the cover, a contact member on the underside of said cover and rotatable therein, and a finger-engageable knob on the outside of said cover for moving said contact member into and out of contact with said contact plates.

References Cited in the file of this patent

UNITED STATES PATENTS 2,240,085     Wells  ---------------- Apr. 29, 1941